US007583671B2

(12) United States Patent
Ramani et al.

(10) Patent No.: US 7,583,671 B2
(45) Date of Patent: Sep. 1, 2009

(54) MULTI-MODAL AUTO COMPLETE FUNCTION FOR A CONNECTION

(75) Inventors: Ramkumar Ramani, Sunnyvale, CA (US); David Stanning Cortright, Los Altos, CA (US); Vinod Pandurang Dhomse, Milpitas, CA (US); Bing Yuan, Pacifica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 569 days.

(21) Appl. No.: 11/285,875

(22) Filed: Nov. 23, 2005

(65) Prior Publication Data

US 2007/0115991 A1      May 24, 2007

(51) Int. Cl.
    *H04L 12/56* (2006.01)
(52) U.S. Cl. ...................... 370/392; 709/206
(58) Field of Classification Search .......... 709/206, 709/217
    See application file for complete search history.

(56) References Cited

U.S. PATENT DOCUMENTS

| | | | |
|---|---|---|---|
| 6,539,421 B1 * | 3/2003 | Appelman et al. | 709/206 |
| 6,567,419 B1 | 5/2003 | Yarlagadda | |
| 6,738,462 B1 * | 5/2004 | Brunson | 379/142.06 |
| 7,210,100 B2 | 4/2007 | Berger et al. | |
| 7,401,105 B2 | 7/2008 | Carro et al. | |
| 2002/0144026 A1 * | 10/2002 | Dunlap et al. | 710/16 |
| 2003/0187936 A1 | 10/2003 | Bodin et al. | |
| 2003/0235287 A1 | 12/2003 | Margolis | |
| 2004/0032860 A1 | 2/2004 | Mundra et al. | |
| 2004/0160979 A1 | 8/2004 | Pepin et al. | |
| 2004/0170161 A1 | 9/2004 | Laumen et al. | |
| 2004/0199582 A1 * | 10/2004 | Kucharewski et al. | 709/204 |
| 2005/0117605 A1 | 6/2005 | Yan et al. | |
| 2005/0123118 A1 | 6/2005 | Terry et al. | |

(Continued)

FOREIGN PATENT DOCUMENTS

EP      1 161 038 A2      12/2001

(Continued)

OTHER PUBLICATIONS

Official Communication for U.S. Appl. No. 11/129,668, mailed on May 12, 2008.

(Continued)

*Primary Examiner*—Jayanti K Patel
*Assistant Examiner*—Anthony Sol
(74) *Attorney, Agent, or Firm*—Darby & Darby P.C.; Jamie L. Wiegand

(57) ABSTRACT

An apparatus, method, and system are directed to managing a multi-modal communication over a network. In one embodiment, the method, apparatus, and system employ an instant messaging client to perform actions. The actions may include receiving contact information associated with a plurality of communication mediums. The contact information includes contact names and addresses that are integrated into a unified contact store. When a user inputs a character for use in initiating a communication, a dynamic search is performed on the unified contact store. The results of the search may be repeatedly updated based on additional input characters. The results display contact names and addresses, where either the contact name or address includes the input character(s). The user may then select an address, and automatically initiate a communication with a contact name associated with the selected address over a communication medium associated with the address.

22 Claims, 7 Drawing Sheets

U.S. PATENT DOCUMENTS

| | | |
|---|---|---|
| 2005/0131888 A1* | 6/2005 | Tafoya et al. ............ 707/3 |
| 2005/0138002 A1 | 6/2005 | Giacobbe et al. |
| 2005/0198144 A1* | 9/2005 | Kraenzel et al. ......... 709/206 |
| 2005/0232284 A1 | 10/2005 | Karaoguz et al. |
| 2005/0238156 A1 | 10/2005 | Turner |
| 2007/0058681 A1 | 3/2007 | Bettis et al. |
| 2007/0115991 A1 | 5/2007 | Ramani et al. |
| 2008/0235669 A1 | 9/2008 | Carro |

FOREIGN PATENT DOCUMENTS

| | | |
|---|---|---|
| WO | WO-01/78430 | 10/2001 |

OTHER PUBLICATIONS

Official Communication for U.S. Appl. No. 11/129,668, mailed on Dec. 10, 2008.

* cited by examiner

MULTI-MODAL AUTO COMPLETE FUNCTION FOR A CONNECTION

BACKGROUND OF THE INVENTION

The present invention relates generally to network communications, and more particularly, but not exclusively, to a system and method for employing a unified multi-modal data store for initiating multi-modal communications over a network.

In today's technological society there are a myriad of mechanisms available to allow an individual to communicate with another individual—that is aside from a 'face to face.' Such mechanisms include, for example, synchronous communications such as Instant Messaging (IM), remote desktop, Voice Over Internet Protocol (VOIP), videoconferencing, Short Messaging Service (SMS), and the like. Examples of asynchronous mechanisms include email, wikis, blogs, Really Simple Syndication (RSS), and so forth.

The problem with having so many different mechanisms to communicate with another individual is that it may sometimes be different to determine which mechanism to use for a given individual. For example, does the other individual even use email, VOIP, or IM? Moreover, having so many mechanisms may also make it difficult to find which mechanism has information about the other individual so as to be able to initiate a communications. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
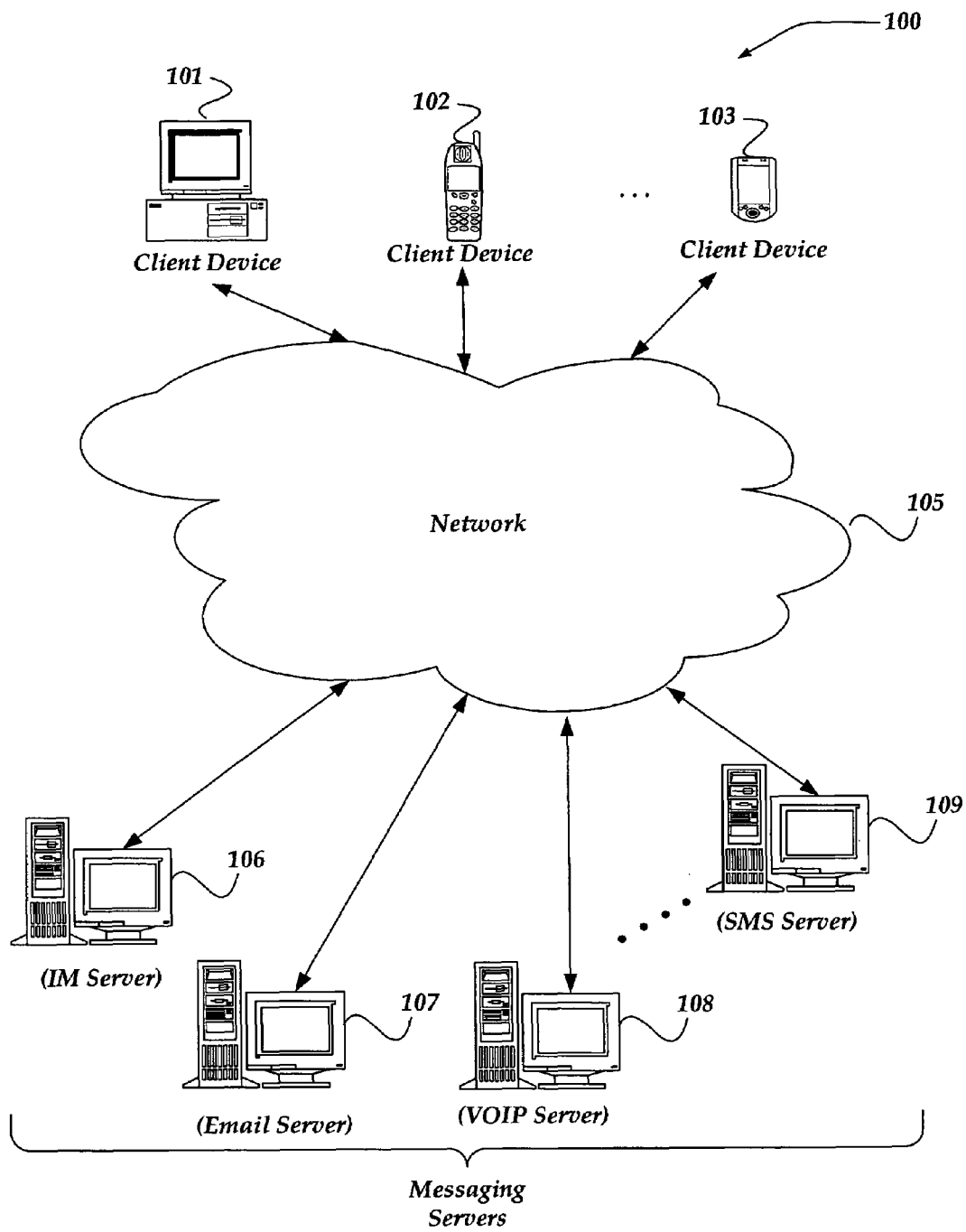
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, although it may. Moreover, the phrase "in another embodiment" as used herein does not necessarily refer to a different embodiment, although it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the present invention is directed towards a system, method, and apparatus for use in managing a multi-modal communication over a network. As used herein, the term "multi-modal" refers to multiple communications mediums (or modes of communication). In one embodiment, the method, apparatus, and system employ an instant messaging client to perform actions. The actions may include receiving contact information associated with a plurality of communication mediums. The plurality of communication mediums may include but is not limited to email, SMS, PC to PC voice calls, PC to PSTN voice calls, or other VOIP calls, IM, or the like. Moreover, the contact information includes contact names and addresses, each address being associated with a communication medium. Thus, the addresses may include SMS addresses, telephone numbers, IM address, email addresses, or the like. The contact names and addresses may be integrated into a unified contact store. In one embodiment, the unified contact store is stored locally to the instant messaging client. When a user inputs a character for use in initiating a communication, a dynamic search is performed on the unified contact store. The results of the search may be repeatedly updated based on additional input characters. The results display contact names and addresses, where either the contact name or address includes the input characters. In one embodiment, the contact names and addresses are displayed in a weighted sort order based on a frequency of communications between the user and the contact name or address. Thus, in one embodiment, where the user frequently employs one communication medium for the same contact name, the communication medium more frequently used may be displayed higher on the displayed list than a less frequently used communication medium. As the user inputs additional characters, the search is dynamically repeated and the displayed list is updated based on the result of the search. The user may then select an address from the displayed list, and automatically initiate a communication with a contact name associated with the address over a communication medium associated with the address.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, however, system 100 includes client devices 101-103, network 105, Instant Messaging (IM) server 106, Email server 107, VOIP server 108, and SMS servers 109. IM server 106, Email server 107, VOIP server 108, and SMS servers 109 are collectively referred to herein as messaging servers 106-109. Each of the messaging servers 106-109 may provide at least one messaging service, including email, IM, VOIP, SMS, or the like. It is noted, however, that messaging servers 106-109 may include a variety of other types of messaging services, and the invention is not limited by those so illustrated in FIG. 1. In any event client devices 101-103 are in communication with each other and each of messaging servers 106-109 through network 105.

One embodiment of client devices 101-103 is described in more detail below in conjunction with FIG. 2. Briefly, however, client devices 101-103 may include virtually any device that is arranged to send and receive communications and messages such as IM messages, VOIP messages, or the like, via one or more wired and/or wireless communication mediums. Such communication mediums include, but are not limited to, IM, SMS, PC to PC voice communication mediums, PC-PSTN voice communication mediums, email, or the like. Thus, for example, client device 103 may be configured to send and/or receive a VOIP message with client device 102 through VOIP server 108, and IM messages through IM server 106.

Typically, client devices 101-103 may be configured to communicate using any of a variety of protocols. For example, client devices 101-103 may be configured to employ RTP for communicating media data such as audio and video to another device. However, the invention is not so limited, and another media data mechanism may be employed, including IAX, and the like. Client devices 101-103 may also employ the SIP protocol for enabling setting up a session and enabling such actions as dialing a number, enabling a ring, a ring-back tone, busy signal, and the like. However, other signaling protocols may also be employed, including H.323, Skinny Client Control Protocol (SCCP), IAX, MiNET, and the like. Typically, however, client devices 101-103 may employ SIP over either UDP or TCP and RTP over UDP.

In addition, client devices 101-103 may also be configured to provide an address during a communication. The address may employ any of a variety of mechanisms, including a device model number, a carrier address, a mobile identification number (MIN), or the like. The MIN may be a telephone number, a Mobile Subscriber Integrated Services Digital Network (MSISDN), an electronic serial number (ESN), or other device address. The address may also be an IP address associated with client devices 101-103. Client devices 101-103 may include a client application that enables managing of multi-modal communications over a network, such as network 105. The client application may, in one embodiment, be an IM client application. However, the invention is not so limited, and the client application may also be another type of interface application, without departing from the scope or spirit of the invention.

The client application may be configured to access various contact information from messaging servers 106-109. The client application may also access contact information from various messaging client applications. The contact information may include such information as a contact name, and at least one address associated with the contact name, where each address is associated with a communication medium. For example, the client application may receive from email server 107 contact information that includes a contact name and email address. The client application may also receive from a local VOIP client application a voice call log, or the like, that includes a contact name and an address in a form such as a telephone number, MIN, ESN, MSISDN, or the like. The client application may then integrate and store the various contact information for use by the user to search for, select, and automatically initiate a communication with a contact name over a communication medium associated with a selected address.

Devices that may operate as client devices 101-103 include devices that typically connect using a wired communications medium such as personal computers, desktop computers, multiprocessor systems, microprocessor-based or programmable consumer electronics, network PCs, and the like. The set of such devices may also include devices that typically connect using a wireless communications medium such as cell phones, smart phones, pagers, walkie talkies, Personal Digital Assistants (PDAs), handheld computers, programmable consumer electronics, radio frequency (RF) devices, infrared (IR) devices, CBs, integrated devices combining one or more of the preceding devices, or virtually any mobile device, and the like. Similarly, client devices 101-103 may be any device that is capable of connecting using a wired or wireless communication medium such as a PDA, POCKET PC, wearable computer, and any other device that is equipped to communicate over a wired and/or wireless communication medium.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 may include any communication medium by which information may travel between computing devices.

The medium used to transmit information in communication links as described above illustrates one type of computer-readable medium, namely communication medium. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media. Moreover, communication mediums may be identified based on a type of protocol, or other communications employed. Thus, email may be one embodiment of a communication medium, while VOIP, SMS, IM, PC to PC, PC to PSTN, or the like, may be viewed as different communication mediums.

One embodiment of a network device configured to operate generally as messaging servers 106-109 is described in more detail below in conjunction with FIG. 2. Briefly, however, messaging servers 106-109 are each configured to enable a communication between one or more client devices, using a messaging service, such as email, IM, SMS, VOIP, or the like. Each of the messaging services may employ a different communication medium.

Messaging servers 106-109 may further include a contact information store that may include one or more contact names with an associated address for use in initiating a communication over a communication medium. Thus, for example, IM server 106 may employ an IM buddy list, friends list, or the like for storing contact information. In another example, email server 107 may manage contact information using one or more email address books, or the like. Moreover, in one embodiment, at least a portion of the contact information from messaging servers 106-109 is accessible to at least one of client devices 101-103.

As illustrated, various messaging servers may be employed to manage communications over various communication mediums. Thus, in one embodiment, VOIP server 108 may be employed to manage voice communications for various voice communication mediums, including, but not limited to PC to PC voice mediums, PC-PSTN voice mediums, or the like. Similarly, IM server 106 may be used to manage instant messaging communications, and so forth.

Messaging servers 106-109 may be implemented on a variety of computing devices including personal computers, desktop computers, multiprocessor systems, microprocessor-based devices, network PCs, servers, network appliances, or the like. Moreover, although messaging servers 106-109 are each illustrated as single network devices, the invention is not so limited. For example, one or more of messaging servers 106-109 may also be implemented using a plurality of servers to provide the respective messaging service.

Illustrative Server Environment

Figure 2:
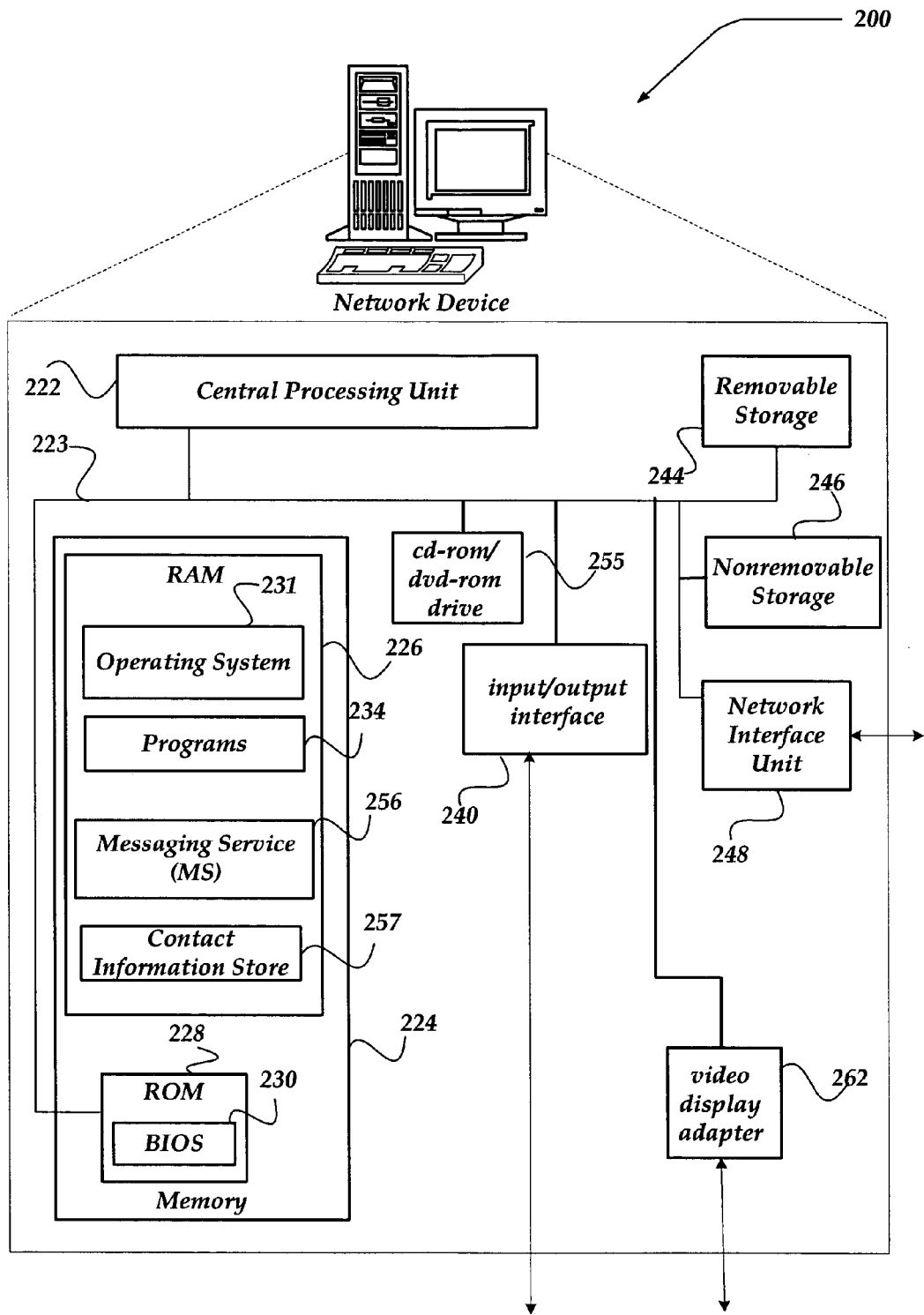
FIG. 2 shows one embodiment of a network device useable as a messaging server.

FIG. 2 shows one embodiment of a server device, according to one embodiment of the invention. Network device 200 may include many more components than those shown. The components shown, however, are sufficient to disclose an illustrative embodiment for practicing the invention. Network device 200 may be, for example, at least one of messaging servers 106-109 of FIG. 1.

Network device 200 includes processing unit 232, video display adapter 263, and a mass memory, all in communication with each other via bus 223. The mass memory generally includes RAM 224, ROM 228, and one or more permanent mass storage devices such as non-removable storage 246 that may be implemented as a hard disk drive, and removable storage 244 that may include a tape drive, optical drive, and/or floppy disk drive. The mass memory stores operating system 220 for controlling the operation of network device 200. Any general-purpose operating system may be employed. Basic input/output system ("BIOS") 230 is also provided for controlling the low-level operation of network device 200. As illustrated in FIG. 2, network device 200 also can communicate with the Internet, or some other communications network, such as network 105 in FIG. 1, via network interface unit 248, which is constructed for use with various communication protocols including the TCP/IP protocol. Network interface unit 248 is sometimes known as a transceiver, transceiving device, network interface card (NIC), and the like.

Network device 200 may also include an SMTP handler application for transmitting and receiving email. Network device 200 may also include an HTTP handler application for receiving and handing HTTP requests, and an HTTPS handler application for handling secure connections. The HTTPS handler application may initiate communication with an external application in a secure fashion.

Network device 200 also includes input/output interface 240 for communicating with external devices, such as a mouse, keyboard, scanner, or other input devices not shown in FIG. 2. Likewise, network device 200 may further include additional mass storage facilities such as CD-ROM/DVD-ROM drive 255. Non removable storage 246 and/or removable storage 244 may be utilized by network device 200 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more programs 234 are loaded into mass memory and run on operating system 231. Examples of application programs include email programs, schedulers, calendars, transcoders, database programs, word processing programs, spreadsheet programs, and so forth. Mass storage may further include messaging server (MS) 256, and contact information store 257.

Contact information store 257 may include a database, text, spreadsheet, folder, file, or the like, that is configured to maintain and store contact information including a contact name and at least one address associated with the contact name. The contact name may include an alias, a user name, or the like. The address may include an email address, an IM address, SMS address, a telephone number, ESN, MIN, or the like. Each address may be associated with a communication medium as described above. Thus, for example, an email address may be associated with an email communication medium, while a telephone number may be associated with a PC to PC voice medium, PC to PSTN voice medium, or the like. In one embodiment, a contact name may have multiple addresses associated with a communication medium. Moreover, in one embodiment, a contact name may have multiple addresses, at least two addresses being associated with different communication mediums.

In one embodiment, the contact information within contact information store 257 is partitioned in a manner such that at least a portion of the contact information is associated with one user of a client device, while another portion of the contact information is associated with another user of another client device. In one embodiment, a portion of the contact information may be inaccessible to at least one user, while accessible to another user.

Moreover, based at least in part, on a type of messaging service, contact information store 257 may include an IM friends list, a buddy list, an email address book, email history log, an IM conversation log, a VOIP store, or the like.

Messaging service (MS) 256 is configured to manage a communications between one or more users using various communication mediums. MS 256 represents any of a variety of messaging services, including, but not limited to email server applications, IM server applications, SMS server applications, VOIP server applications, or the like. Moreover, although a single MS 256 is illustrated, the invention is not so limited, and network device 200 may include one or more messaging services, without departing from the scope or spirit of the invention.

In one embodiment, MS 256 may be configured to manage communications using a variety of communication mediums. In one embodiment, at least one MS 256 may be configured to manage a communication using a single communication medium. MS 256 may also be configured to employ contact information within contact information store 257 to enable a communications.

In one embodiment, MS 256 may enable a client device to access at least a portion of the contact information within contact information store 257. For example, in one embodiment, when a client device establishes a connection with network device 200, MS 256 may provide at least a portion of the contact information to the client device. In one embodiment, the contact information may also be provided to the client device based on a request for the information, or the like.

MS 256 may also be configured to update contact information within contact information store 257 based on a communication between two or more client devices, a request to modify the contact information received from a client device, or even based on a history log, or the like, received from a client device, or another network device, or the like. Thus, in one embodiment, MS 256 may also provide updated contact information to a client device, based at least in part, on the occurrence of the update.

Illustrative Client Device

Figure 3:
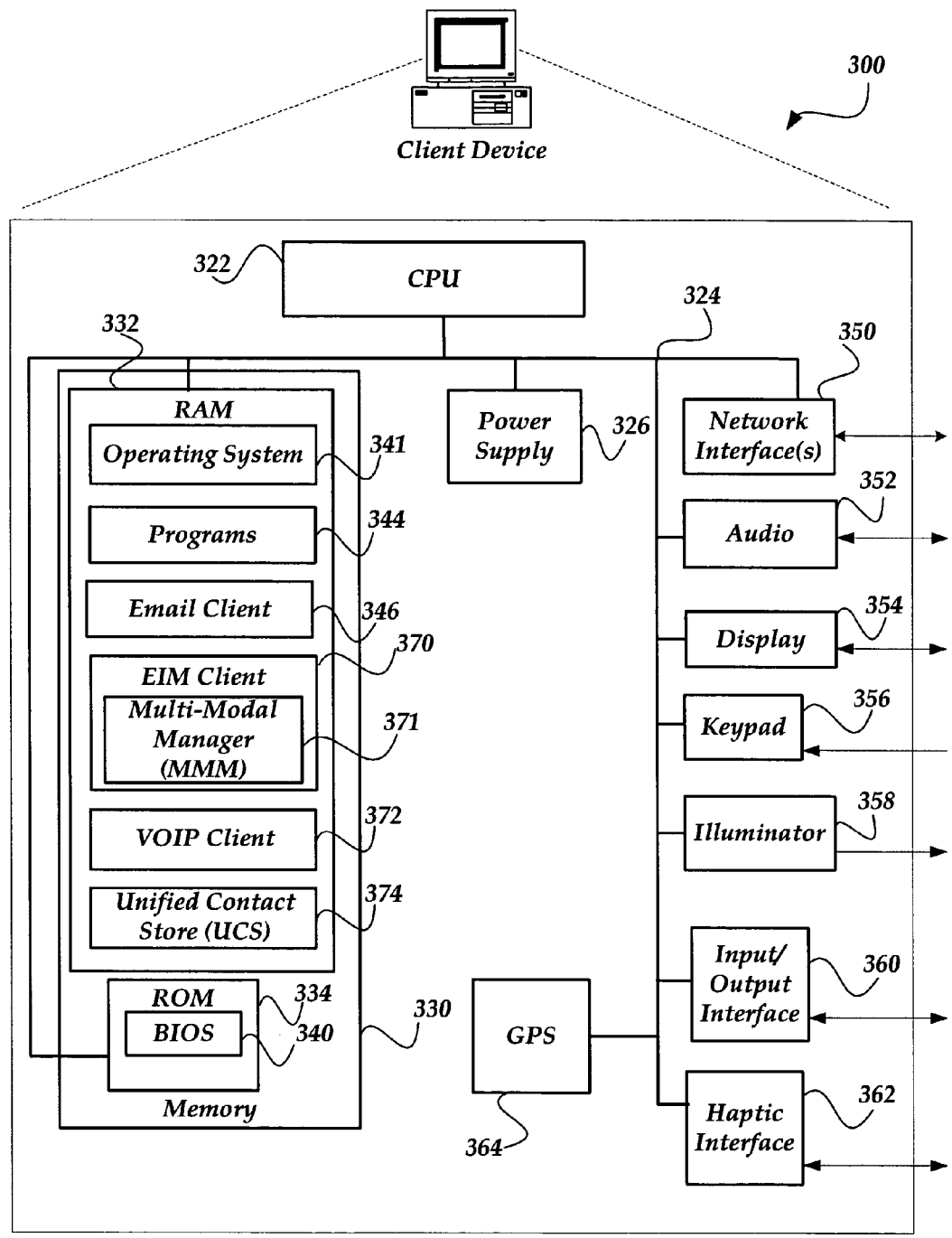
FIG. 3 shows one embodiment of a client device that may be included in a system implementing the invention.

FIG. 3 shows one embodiment of client device 300 that may be included in a system implementing the invention. Client device 300 may include many more or less components than those shown in FIG. 3. However, the components shown are sufficient to disclose an illustrative embodiment for practicing the present invention.

As shown in the figure, client device 300 includes a processing unit 322 in communication with a mass memory 330 via a bus 324. Client device 300 also includes a power supply 326, one or more network interfaces 350, an audio interface 352, a display 354, a keypad 356, an illuminator 358, an input/output interface 360, a haptic interface 362, and an optional global positioning systems (GPS) receiver 364. Power supply 326 provides power to client device 300. A rechargeable or non-rechargeable battery may be used to provide power. The power may also be provided by an external power source, such as an AC adapter or a powered docking cradle that supplements and/or recharges a battery.

Client device 300 may optionally communicate with a base station (not shown), or directly with another computing device. Network interface 350 includes circuitry for coupling client device 300 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or the like.

Audio interface 352 is arranged to produce and receive audio signals such as the sound of a human voice. For example, audio interface 352 may be coupled to a speaker and microphone (not shown) to enable telecommunication with others and/or generate an audio acknowledgement for some action. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand. Keypad 356 may comprise any input device arranged to receive input from a user. For example, keypad 356 may include a push button numeric dial, or a keyboard. Keypad 356 may also include command buttons that are associated with selecting and sending images. Illuminator 358 may provide a status indication and/or provide light. Illuminator 358 may remain active for specific periods of time or in response to events. For example, when illuminator 358 is active, it may backlight the buttons on keypad 356 and stay on while the client device is powered. Also, illuminator 358 may backlight these buttons in various patterns when particular actions are performed, such as dialing another client device. Illuminator 358 may also cause light sources positioned within a transparent or translucent case of the client device to illuminate in response to actions.

Client device 300 also comprises input/output interface 360 for communicating with external devices, such as a headset, or other input or output devices not shown in FIG. 3. Input/output interface 360 can utilize one or more communication technologies, such as USB, infrared, Bluetooth™, and the like. Haptic interface 362 is arranged to provide tactile feedback to a user of the client device. For example, the haptic interface may be employed to vibrate client device 300 in a particular way when another user of a computing device is calling.

Optional GPS transceiver 364 can determine the physical coordinates of client device 300 on the surface of the Earth, which typically outputs a location as latitude and longitude values. GPS transceiver 364 can also employ other geo-positioning mechanisms, including, but not limited to, triangulation, assisted GPS (AGPS), E-OTD, CI, SAI, ETA, BSS and the like, to further determine the physical location of client device 300 on the surface of the Earth. It is understood that under different conditions, GPS transceiver 364 can determine a physical location within millimeters for client device 300; and in other cases, the determined physical location may be less precise, such as within a meter or significantly greater distances.

Mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of client device 300. The mass memory also stores an operating system 341 for controlling the operation of client device 300. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 330 further includes one or more data storage 342, which can be utilized by client device 300 to store, among other things, programs 344 and/or other data. For example, data storage 342 may also be employed to store information that describes various capabilities of client device 300. The information may then be provided to another device based on any of a variety of events, including being sent as part of a header during a communication, sent upon request, and the like.

Programs 344 may include computer executable instructions which, when executed by client device 300, transmit, receive, and/or otherwise process messages (e.g., SMS, MMS, IM, email, and/or other messages), audio, video, and enable telecommunication with another user of another client device. Other examples of application programs include calendars, contact managers, task managers, transcoders, database programs, word processing programs, spreadsheet programs, games, codec programs, and so forth. In addition, mass memory 330 may store various messaging client applications including email client 346, Enhanced IM (EIM) client 370, and VOIP client 372, as well as unified contact store (UCS) 374. In one embodiment, EIM client 370 includes Multi-modal Manager (MMM) 371. In another embodiment, MMM 371 is a distinct component from EIM 370. Client device 300 may also include other messaging client applications in addition to, or instead of at least some of those illustrated in FIG. 3.

Email client 346 is configured to enable access to an email server in a local or remote network. Also known as an "e-mail messaging client application," "mail client," "mail program," and "mail reader," email client 346 provides the ability to send and receive e-mail messages and a file attachment using a variety of communication protocols, including but not limited to Post Office Protocol (POP), Internet Message Access Protocol (IMAP), Simple Mail Transfer Protocol (SMTP), or the like. In one embodiment, email client 346 may also employ Multipurpose Internet Mail Extensions (MIME) for use in transmitting non-text files over a network. Email client 346, thus provides for an email communication medium. Moreover, email client 346 may be a stand-alone program, or a messaging client application configured within a browser application, or the like.

In one embodiment, email client 346 may manage an address book that includes contact information such as contact names and associated email addresses. However, email client 346 may also manage contact information in another mechanism, including, for example, an email history log, or the like. In one embodiment, a contact name may have more than one email address associated with it. In one embodiment, the address book is stored and managed local to client device 300. In another embodiment, at least a portion of the address book is located on a network server.

VOIP client 372 is configured to enable client device 300 to initiate, receive, and manage a VOIP session with another client device. VOIP client 372 may employ the SIP protocol for managing signaling, and RTP for transmitting the VOIP traffic ("media"). However, the invention is not so constrained, and any of a variety of other VOIP protocols may be employed including IAX which carries both signaling and voice data, H.323, Megaco, MGCP, MiNET, Skinny Client Control Protocol (SCCP), or the like. VOIP client 372 is further configured to employ virtually any media codec to compress the media stream for communicating it over the network, including G.711, G.729, G.729a, iSAC, Speex, and the like. In one embodiment, SIP may be employed to enable a Session Description Protocol (SDP).

In one embodiment, VOIP client 372 may also store and manage a voice call log, or the like. The voice call log, or the like, may include various contact information including a contact name and an associated address. The address may include a telephone number, MSIDSN, MIN, a network address such as an IP address, or the like. In one embodiment, at least a portion of the voice call log may be stored on a network server.

IM client 370 may be configured to initiate and manage an instant messaging session. IM client 370 may include but not be limited to such messaging client applications as AOL Instant Messenger, Yahoo! Messenger, NET Messenger Server, ICQ, or the like. In one embodiment, IM client 370 is configured to employ a VOIP client, such as VOIP client 372 to integrate IM/VOIP features. Thus, in one embodiment, IM client 370 may employ SIP to establish media sessions with another computing device employing an IM/VOIP capable client, and RTP to communicate the media traffic. However IM client 370 is not so limited. For example, IM client 370 may also employ any of the following SIMPLE (SIP for Instant Messaging and Presence Leverage), APEX (Application Exchange), Prim (Presence and Instant Messaging Protocol), the open XML-based XMPP (Extensible Messaging and Presence Protocol), more commonly known as Jabber and OMA (Open Mobile Alliance)'s IMPS (Instant Messaging and Presence Service) created specifically for mobile devices, or the like.

Moreover, IM client 370 may be configured to store and manage contact information useable to employ an IM communication medium to initiate an IM session. In one embodiment, the contact information is managed within a buddy list, an IM friends list, IM conversation history log, or the like, that may be stored locally on client device 300. In one embodiment, some or all of the IM contact information may also be stored on a network server.

MMM 371 is configured to manage and enable automatic initiation of multi-modal communications based on a selection of an address by a user. MMM 371 may gather contact information from a variety of messaging applications, including email client 346, EIM client 370, VOIP client 372, or the like, as well as networked messaging services such as those illustrated in FIG. 1, or the like. MMM 371 may then integrate the contact information along with an identified communication medium for the contact information in a data store such as UCS 374. In one embodiment, MMM 371 may normalize the contact information so that it may be presented to a user, and/or is readily searchable. In one embodiment, normalization may include, but is not limited to, reformatting of the contact information into a common searchable data structure. As such, UCS 374 may employ a spreadsheet, a database, or the like, to store and manage the unified contact information. In one embodiment, MMM 371 may update UCS 374 periodically, or based on some event, condition such as boot-up, application startup, an update event, or the like.

MMM 371 may be accessed by a user, in one embodiment, through an interface that allows the user to enter at least one character into a displayed entry field useable for searching for contact information. One embodiment of such an interface is described in more detail below in conjunction with FIG. 5. MMM 371 may search UCS 374 for matching contact information, based on the at least one character. In one embodiment, the search is performed each time the user enters another character. In one embodiment, the search is performed based on a match of at least a portion of the contact information. MMM 371 may then repeatedly display and revise the display of a list of candidate contact names and associated addresses that match the entered characters. The user may then continue to provide more characters, or select an address from the displayed contact information. When an address is selected, MMM 371 may automatically employ the address to initiate a communication to the associated contact name using a communication medium associated with the selected address. In one embodiment MMM 371 may employ a process substantially similar to process 400 described below in conjunction with FIG. 4.

Generalized Operation

Figure 4:
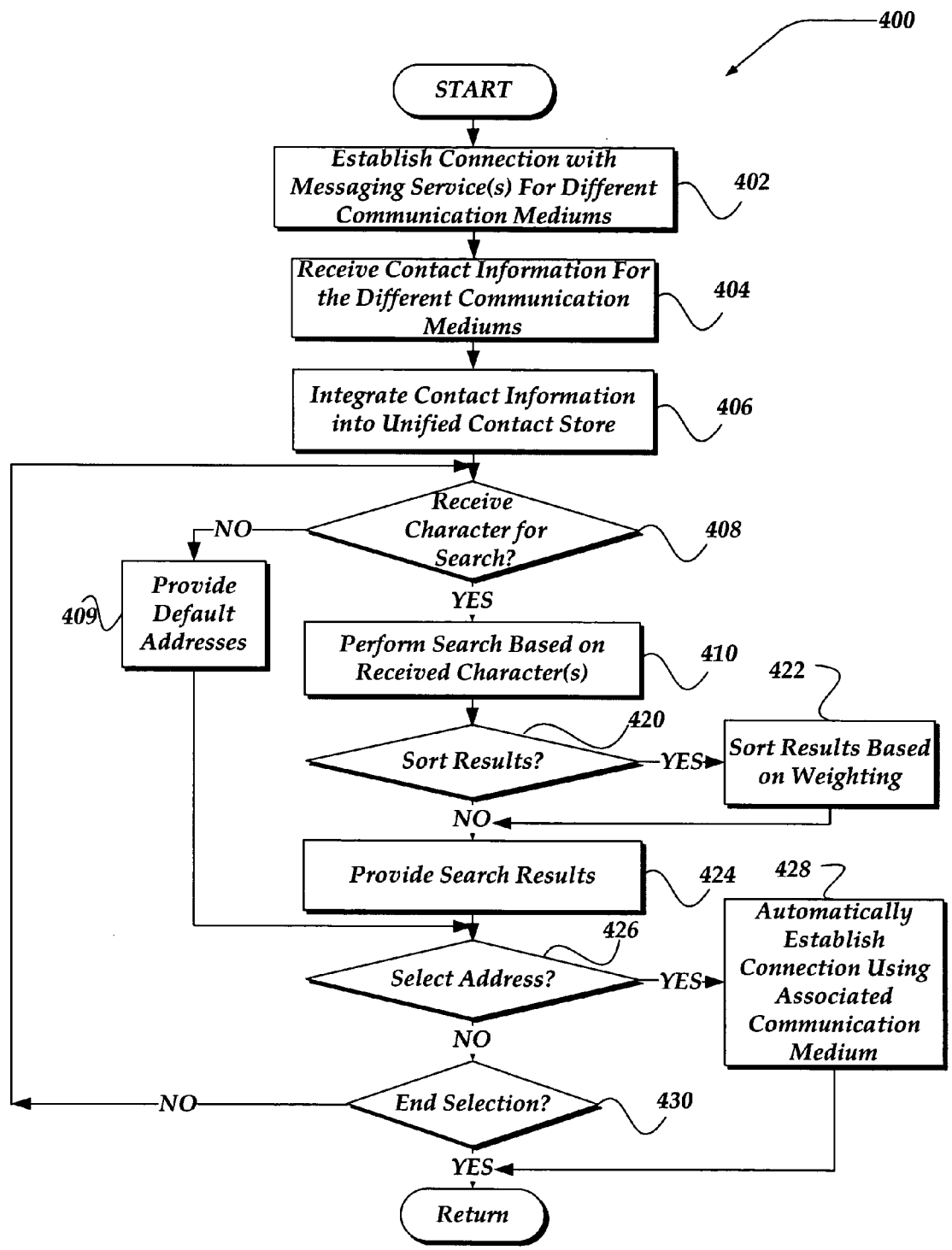
FIG. 4 illustrates a logical flow diagram generally showing one embodiment of a process for use in managing multi-modal communications.
Figure 5:
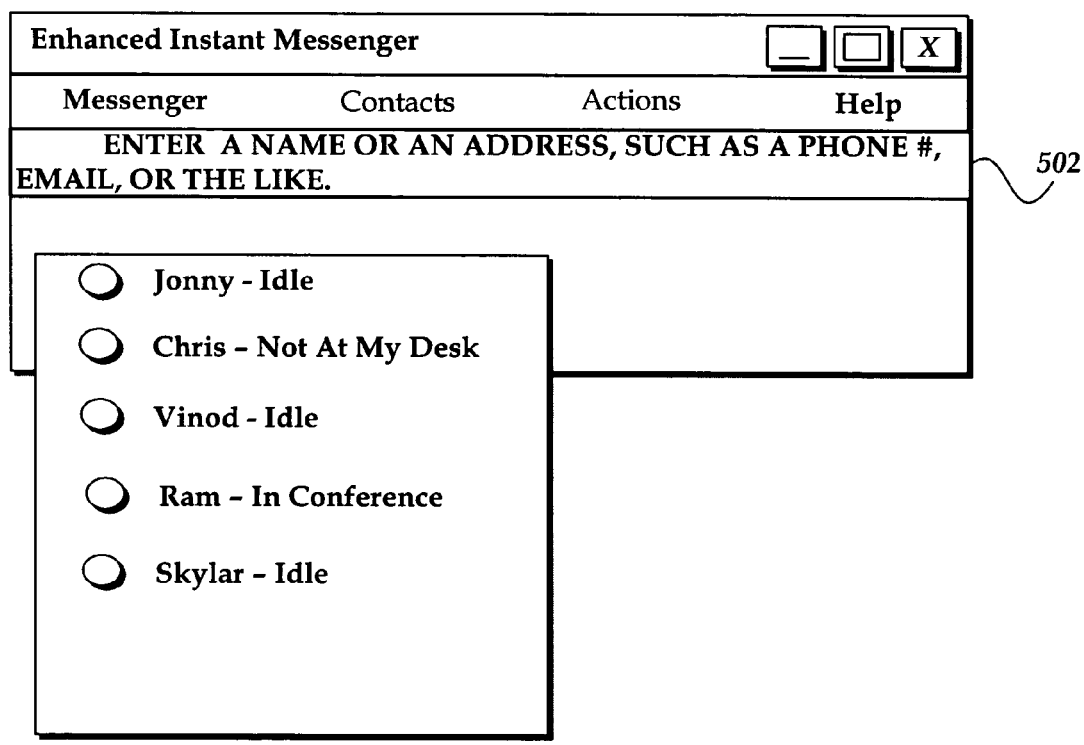
FIGS. 5-7 illustrate embodiments of possible interfaces for use in managing multi-modal communications, in accordance with the present invention.
Figure 6:
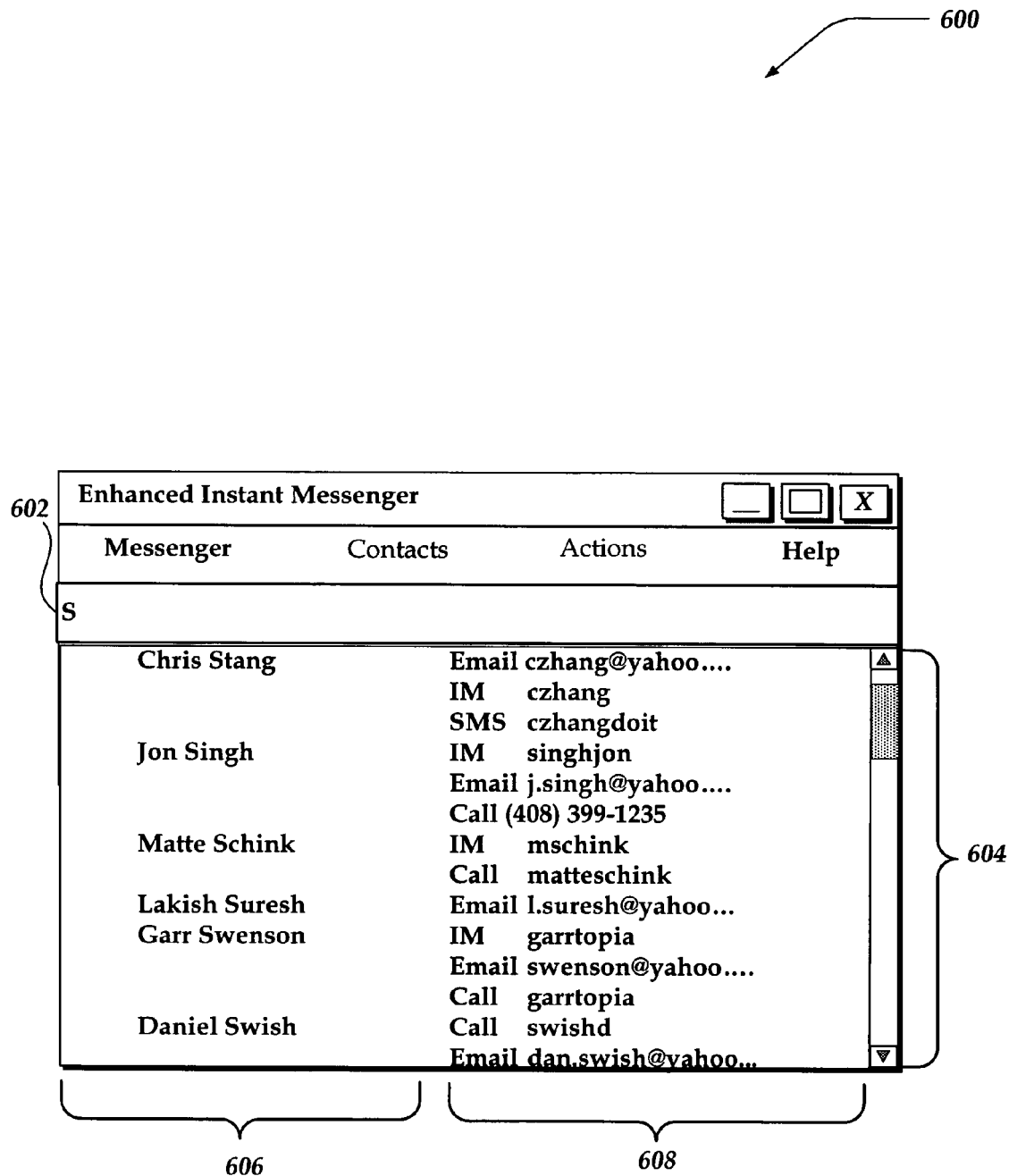
Figure 7:
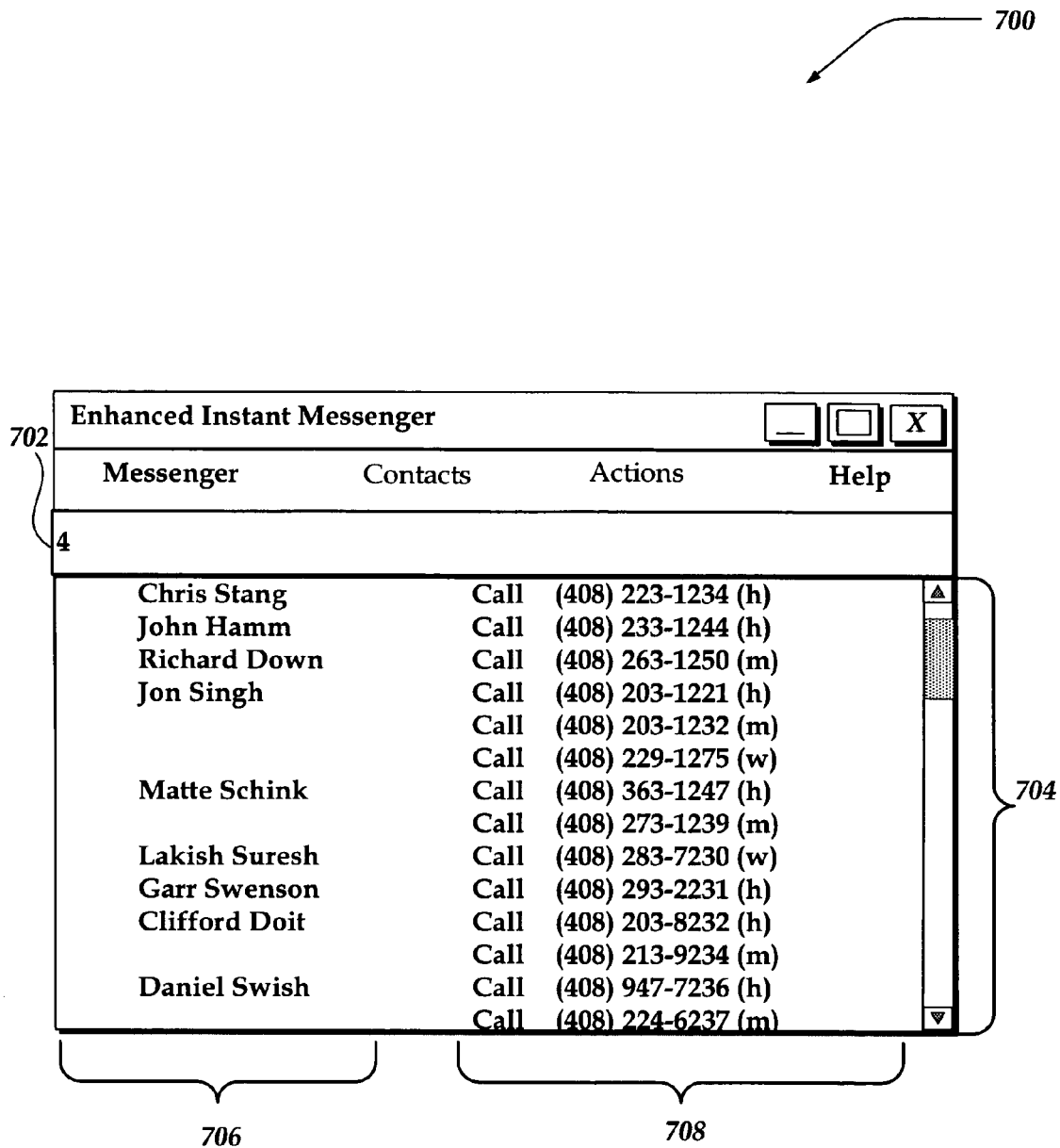

The operation of certain aspects of the invention will now be described with respect to FIG. 4. FIG. 4 illustrates a logical flow diagram generally showing one embodiment of a process for use in managing multi-modal communications. FIGS. 5-7 illustrate embodiments of possible interfaces useable with process 400 of FIG. 4.

As shown in FIG. 1, process 400 begins, after a start block, at block 402, wherein a connection is established with one or more messaging services for one or more different communication mediums. In one embodiment, the connections are established over a network. In another embodiment, the connections are to local messaging services, such as client messaging applications, or the like.

Process then continues to block 404, where contact information may be received from the one or more messaging services, where each of the messaging services is associated with one or more different communication mediums. Moreover, as described above, the contact information may include at least one contact name and an associated address, the address being associated with a communication medium. Thus, the address may be an email address, a VOIP address, an IM address, SMS address, or the like. Such contact information may be received from an IM friends list, a buddy list, an email address book, an IM conversation history log, an email history log, a voice call log, or the like.

Processing continues next to block 406, where the received contact information is integrated and stored into a unified contact store. In one embodiment, the integrated contact information may also be normalized to make it readily available to search and/or display at least a subset of the contact information.

Process 400 flows next to decision block 408, where a determination is made whether a character is received that is to be used for searching for contact information. In one embodiment, as process 400 loops, more than one character is received. Thus, process 400 is illustrated to enable multiple characters to be received, and tested for. If a character is received, processing flows to block 410; otherwise processing flows to block 409.

At block 409, at least one character is not received. Thus, a default set of addresses may be displayed to the user. In one embodiment, an additional condition may be evaluated, such as whether a drop-down menu for displaying addresses is opened, before displaying the default set of addresses. In one embodiment, the default set of addresses may include contact names and their associated addresses from a history log, such as an IM history log, a voice history log, an email log, or the like. In another embodiment, the default set of addresses includes all contact names and associated addresses within the unified contact store. However, the invention is not so limited, and other default addresses may also be displayed. Moreover, in one embodiment, the default set of addresses may be an empty set—that is, no contact names and addresses might be displayed. In any event, where at least one contact name and address is displayed, processing proceeds to decision block 426.

At block 410, a search is performed on the unified contact store for a match of the received character(s). Matching of the received character(s) may be based on a variety of mechanisms. For example a match may be based on a first character match in a contact name, an address, or the like. Similarly, a match may be based on a character within an address. For example, where the address is a telephone number, the search might ignore an area code associated with the address and perform a match search based on characters within a prefix of the telephone number, or the like.

In any event, processing flows next to decision block 420, where a determination is made whether a result of the search is to be sorted. If it is processing flows to block 422; otherwise, processing flows to block 424. In one embodiment, the results might be unsorted and instead be displayed based on an order in which the match is found in the search.

At block 422, the results may be ordered based on a variety of criteria. For example, in one embodiment, the results may be ordered based on a frequency with which a user has communicated with the contact name in the results. In another embodiment, the ordering may be based on a weighting associated with a frequency of use of an address by the user to communicate with a contact name in the results. The invention is not so limited, however, and any of a variety of other sorting criteria may be used, without departing from the scope or spirit of the invention. Upon completion of block 422, processing continues to block 424.

At block 424, the search results may be displayed to the user. In one embodiment, the search results may be dynamically revised and displayed when another character is received at block 410. In one embodiment, a subset of the results may be displayed to the user. In another embodiment, the display interface may include a mechanism that allows the user to scroll through the displayed results. The display interface may further enable the user to select an address, contact name or the like from the displayed search results.

Processing continues to decision block 426, where a determination is made whether an address has been selected from the displayed results. Because a contact name may have multiple addresses associated with it, the user typically may select the address. For example, the user may select a telephone number, an email address, or the like for a contact name. In any event, if an address is selected, processing flows to block 428; otherwise, process flows to decision block 430.

At block 428, a communication is automatically initiated with the contact name associated with the selected address using the communication medium associated with the selected address. Thus, for example, selecting an email address results in a window, frame, or other interface, being automatically displayed for use in preparing and sending an email message to the selected address. In one embodiment, an associated messaging client application may be automatically 'launched' for use by the user. In one embodiment, the selected address and contact name may be automatically entered into a header field, or the like, for the user. The user may then enter additional text, change a header, or the like, and send the communication using the communication medium associated with the selected address. Process 400 then returns to a calling process to perform other actions.

At decision block 430, a determination is made whether to end the multi-modal automatic selection process. In one embodiment, this may be determined by the user changing use of interfaces, explicitly terminating the process, or the like. In any event if the process is terminated, the process returns to a calling process to perform other actions. Otherwise, if the process is not terminated, then the process branches back to decision block 408 to receive another character for use in searching the unified contact store. By looping back through decision block 408, the process may receive additional characters for use in the search. Furthermore, although not illustrated, at any point, the user may select to delete one or more of the entered characters. Such deletions may result in a new search being performed based on a remaining character. In one embodiment, when no characters are received, no search might be performed.

Moreover, although blocks 402 and 404 are illustrated in a flow that appears to perform once for the process, the invention is not so limited. For example, in one embodiment, blocks 402 and/or 404 may be performed based on some event, condition or the like, independent of the execution of the other blocks of process 400. For example, contact information may be received (block 404) periodically, or based on some condition such as when a messaging service performs an update on its contact information, or the like.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions. Moreover, at least some of the blocks of the flowchart illustration, and combinations of some of the blocks in the flowchart illustration, can also be implemented using a manual mechanism, without departing from the scope or spirit of the invention.

FIGS. 5-7 illustrate embodiments of possible interfaces for use in managing multi-modal communications, and may be employed to further illustrate process 400 of FIG. 4.

Thus, FIG. 5 illustrates one embodiment of a possible interface for use in entering at least one character for searching the unified contact store described above. As shown in the figure, interface 500 includes entry field 502 that is configured to receive one or more characters. The characters may include virtually any alphanumeric character that may be employed in contact information. In one embodiment, entry field 502 may be used to receive one or more characters as described in process 400 above at block 404.

FIG. 6 illustrates one embodiment of a possible interface for use in displaying a search result, such as is described above at block 424 of process 400. As shown in the figure, entered character 602 may result in a display of contact information results 604. Contact information results 604 include contact names 606 and addresses 608 associated with contact names 606. As illustrated, an entry of the character "S" may result in a search being performed on contact names that may begin with the entered character 602 (the letter "S"). As described above, the results may be sorted based on any of a variety of criteria, including a frequency of communications between the user and the contact name, address, or the like. In one embodiment, entry of an alpha character may display contact information that matches one or more characters in a contact name, an address, or the like. Thus, in one embodiment, entry of the letter "S," as shown may display matches on the letters in the contact name, and/or a match to a letter within an address, such as an IM address, an email address, an SMS address, or the like.

FIG. 7 illustrates another embodiment of a possible of a possible interface for use in displaying a search result, such as is described above at block 424 of process 400. As shown in the figure entered character 702 may result in a display of contact information results 704. The contact information, which includes contact names 706 and addresses 708, may be sorted based on a variety of criteria, as described above. Moreover, as shown, the results of the search (contact information results 704) may be based on a match of entered character 702 to an area code in a telephone number with addresses 708. However, in one embodiment, the invention may be arranged to search on a match based on another component of the address, including a telephone prefix (the second set of numbers in a telephone numbers after the area code), or the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A client device that is configured for use in initiating a communication over a network, comprising:
   a transceiver for receiving and for sending information over the network; and
   a messaging client that is arranged to perform actions comprising:
      receiving contact information from a plurality of messaging services, each messaging service being associated with a different communication medium and having contact information that includes at least one contact name and an associated address;
      integrating the contact information in a unified contact store; and
      if at least one character is received:
         displaying a list of contact names from the unified contact store based on the at least one received character, each contact name having displayed with it at least one address, wherein for each contact name that is associated with more than one address further displaying the addresses for each contact name contiguously based on a weighted ordering of each address associated based on a frequency of communications using each address,
         enabling selection of a contact name and address from the displayed list independent of the communication medium associated with the selected contact name and address, and
         automatically establishing the communication with the selected contact name using a communication medium associated with the selected address, wherein the communication medium used is independent of the messaging client.

2. The client device of claim 1, the actions further comprising:
if at least one character is not received:
displaying another list of contact names from the unified contact store based on at least one of a history log, or a default set of contact names, each contact name having displayed with it at least one address;
enabling selection of a contact name and address from the displayed list; and
automatically establishing the communication with the selected contact name using a communication medium associated with the selected address.

3. The client device of claim 1, wherein displaying the list of contact names further comprises:
performing a search within the unified contact store based on the at least one received character; and
selecting for display contact names and addresses that include the at least one character in either the contact name or the address.

4. The client device of claim 1, wherein the at least one character further comprises a portion of a telephone number, a portion of an email address, a portion of an SMS address, a portion of an IM address, or a portion of a contact name.

5. The client device of claim 1, wherein displaying the list of contact names further comprises:
displaying the list of contact names with at least one contact name in the list of contact names having multiple addresses displayed for the at least one contact name.

6. The client device of claim 1, wherein the messaging client is an instant messaging application.

7. The client device of claim 1, wherein the different communication mediums further comprise at least one of email, SMS, IM, PC to PC voice call, or a PC to PSTN voice call.

8. A method operating within a client computing device that is configured to perform actions for initiating a communication over a network, comprising:
receiving contact information associated with a plurality of communication mediums, the contact information including at least one contact name with an associated address that employs an associated communication medium; and
if at least one character is received:
displaying through a messaging client a dynamic list of at least one contact name with an associated address, the list being determined based on the at least one received character, wherein for each contact name within the displayed list having more than one associated address displaying the list of addresses for that contact name contiguously using a weighted ordering based on a frequency of communications for each address.
enabling selection an address from the dynamic list from within the same messaging client, and
automatically initiating the communication using the communications medium associated with the selected address, wherein the communication medium used to initiate the communications is independent of the messaging client.

9. The method of claim 8, further comprising:
if at least one character is not received:
displaying another list of contact names from the unified contact store based at least in part on a default set of contact names, each contact name having displayed with it at least one address;
enabling selection of a contact name and address from the displayed list; and
automatically establishing the communication with the selected contact name using a communication medium associated with the selected address.

10. The method of claim 8, wherein the messaging client is an instant messaging client application.

11. The method of claim 8, wherein the communication mediums further comprise at least one of email, SMS, IM, PC to PC voice call, or PC to PSTN voice call.

12. The method of claim 8, further comprising:
integrating the contact information in a unified contact store; and
in response to receiving the at least one character, dynamically repeating a search of the unified contact store for a match of the at least one character within at least one of a contact name or address.

13. The method of claim 8, wherein the at least one character further comprises a portion of a telephone number, a portion of an email address, a portion of a SMS address, a portion of an IM address, or a portion of a contact name.

14. The method of claim 8, wherein displaying the dynamic list further comprises displaying presence information associated with the at least one contact name.

15. A computer-readable storage medium that is configured to include program instructions for performing the method of claim 8.

16. A computer-readable storage medium having computer-executable instructions for performing steps for use in initiating a communication over a network, the steps comprising:
receiving contact information associated with a plurality of communication mediums, the contact information including a contact name and address for each of the plurality of communication mediums;
integrating the contact information in a unified contact store; and
if an input is received comprising at least one character for use in searching:
displaying within a multi-modal manager component a list of contact names each contact name having displayed an address, the list being dynamically determined based on the at least one received character, and wherein for each contact name in the displayed list having more than one associated address using a weighted ordering of each address associated with the same contact name contiguously based on a frequency of communications using each address,
enabling through the multi-modal manager component selection of an address for a contact name from the list of contact names and addresses, wherein the selection is independent of a respective communication medium, and
automatically initiating using the multi-modal manager component the communication using a communication medium associated with the selected address, and wherein the multi-modal manager component is configured to enable the communication to be initiated independent of the communication medium used.

17. The computer-readable storage medium of claim 16, the steps further comprising:
if the input comprising at least one character for use in searching is not received:
displaying another list of contact names based on at least a portion of at least one history log, each contact name having displayed with it at least one address;
enabling selection of a contact name and address from the displayed list; and automatically establishing the communication with the selected contact name using a communication medium associated with the selected address.

18. The computer-readable storage medium of claim 16, wherein an instant messaging application is configured to include the computer-executable instructions for performing the steps of claim 16.

19. The computer-readable storage medium of claim 16, wherein displaying the list of contact names and addresses further comprises:
    displaying the list of contact names with at least one contact name in the list of contact names having displayed with it multiple addresses.

20. The computer-readable storage medium of claim 16, wherein the communication mediums further comprise at least one of email, SMS, IM, PC to PC voice call, or PC to PSTN voice call.

21. A system for use in initiating a communication over a network, comprising:
    a plurality of messaging services, wherein each messaging service being associated with a communication medium and having a list of contact names with an address associated with each contact name in the list of contact names;
    an instant messaging (IM) client that is in communication with the plurality of messaging applications, and is arranged to perform actions, comprising:
        receiving contact information from the plurality of messaging applications;
        integrating the contact information in a unified contact store;
        dynamically searching the unified contact store based on receiving of input characters;
        displaying a dynamically updated list of contact names, each contact name having displayed with it at least one address, the list being determined based on the dynamic search, wherein for each contact name in the displayed list having more than one address further weight ordering each address for that contact name contiguously based on a frequency of communications using each address;
        enabling selection of an address from the displayed dynamic list; and
        automatically initiating the communication to a contact name using a communication medium associated with the selected address, wherein the communication medium is other than an IM communication medium.

22. The system of claim 21, wherein the input characters further comprises at least a portion of a telephone number, a portion of an email address, a portion of an IM address, a portion of an SMS address, or a portion of a contact name.

* * * * *

UNITED STATES PATENT AND TRADEMARK OFFICE
CERTIFICATE OF CORRECTION

| | | |
|---|---|---|
| PATENT NO. | : 7,583,671 B2 | |
| APPLICATION NO. | : 11/285875 | |
| DATED | : September 1, 2009 | |
| INVENTOR(S) | : Ramkumar Ramani et al. | |

It is certified that error appears in the above-identified patent and that said Letters Patent is hereby corrected as shown below:

In column 3, lines 50-57, delete "Client devices 101-103 may include a client application that enables managing of multi-modal communications over a network, such as network 105. The client application may, in one embodiment, be an IM client application. However, the invention is not so limited, and the client application may also be another type of interface application, without departing from the scope or spirit of the invention." and insert the same on Col. 3, Line 51 as a new paragraph.

In column 8, lines 19-33, delete "Keypad 356 may comprise any input device arranged to receive input from a user. For example, keypad 356 may include a push button numeric dial, or a keyboard. Keypad 356 may also include command buttons that are associated with selecting and sending images. Illuminator 358 may provide a status indication and/or provide light. Illuminator 358 may remain active for specific periods of time or in response to events. For example, when illuminator 358 is active, it may backlight the buttons on keypad 356 and stay on while the client device is powered. Also, illuminator 358 may backlight these buttons in various patterns when particular actions are performed, such as dialing another client device. Illuminator 358 may also cause light sources positioned within a transparent or translucent case of the client device to illuminate in response to actions." and insert the same on Col. 8, Line 19 as a new paragraph.

In column 10, line 9, delete "MSIDSN," and insert -- MSISDN, --, therefor.

In column 10, line 16, delete "NET" and insert -- .NET --, therefor.

In columns 10-11, lines 64-67 and 1-12, delete "MMM 371 may search UCS 374 for matching contact information, based on the at least one character. In one embodiment, the search is performed each time the user enters another character. In one embodiment, the search is performed based on a match of at least a portion of the contact information. MMM 371 may then repeatedly display and revise the display of a list of candidate contact names and associated addresses that match the entered characters. The user may then continue to provide more characters, or select an address from the displayed contact information. When an address is selected, MMM 371 may automatically employ the address to initiate a communication to the associated contact name using a communication medium associated with the selected address. In one embodiment MMM 371 may employ a process substantially similar to process 400 described below in conjunction with FIG. 4." and insert the same on Col. 10, Line 64 as a new paragraph.

UNITED STATES PATENT AND TRADEMARK OFFICE
CERTIFICATE OF CORRECTION

PATENT NO. : 7,583,671 B2
APPLICATION NO. : 11/285875
DATED : September 1, 2009
INVENTOR(S) : Ramkumar Ramani et al.

It is certified that error appears in the above-identified patent and that said Letters Patent is hereby corrected as shown below:

In column 15, line 52, in claim 8, delete "address." and insert -- address, --, therefor.

Signed and Sealed this

Twentieth Day of October, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,583,671 B2 |
| APPLICATION NO. | : 11/285875 |
| DATED | : September 1, 2009 |
| INVENTOR(S) | : Ramani et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 723 days.

Signed and Sealed this

Fourteenth Day of September, 2010

David J. Kappos
*Director of the United States Patent and Trademark Office*